(12) United States Patent  (10) Patent No.: US 6,722,776 B1
Lyons et al.  (45) Date of Patent: Apr. 20, 2004

(54) LIGHT BAR AND METHOD OF ASSEMBLY THEREFOR

(75) Inventors: Jon H. Lyons, Haddam, CT (US); William F. Grote, Deep River, CT (US); Peter J. Tiezzi, III, Chester, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 0 days.

(21) Appl. No.: 10/022,315

(22) Filed: Dec. 18, 2001

(51) Int. Cl.[7] ............................. B60Q 1/00; B60Q 1/26
(52) U.S. Cl. ................. 362/493; 362/544; 362/249; 362/547; 362/373
(58) Field of Search .................. 362/294, 373, 362/249, 544, 547, 252, 368, 370, 493

(56) References Cited

U.S. PATENT DOCUMENTS 4,620,268 A * 10/1986 Ferenc ..................... 362/517
5,027,260 A * 6/1991 Lyons et al. ............... 362/542
5,452,188 A * 9/1995 Green et al. ............... 362/493
5,884,997 A * 3/1999 Stanuch et al. ............ 362/493

* cited by examiner

Primary Examiner—Thomas M. Sember
(74) Attorney, Agent, or Firm—Alix, Yale & Ristas, LLP

(57) ABSTRACT

A light bar incorporates an extruded base and top panel where the top panel is supported above the base by two ruggedly constructed electronics enclosures. The base top panel and electronics enclosures form a structure to which various light units, lenses and covers are attached to form the finished light bar. The top panel is one of the last components to be installed, leaving the internal components of the light bar accessible during assembly. Each electronics enclosure may surround a power supply that includes a heat-generating component, such as a power transistor. Each enclosure is provided with an opening through which the heat-generating component protrudes to form a heat transfer interface with a heat sink plate mounted to the outside of the enclosure. A further heat transfer interface is formed between the heat sink plate and the top panel in the assembled light bar.

15 Claims, 6 Drawing Sheets

LIGHT BAR AND METHOD OF ASSEMBLY THEREFOR

BACKGROUND OF THE INVENTION

1. Field of the Invention

The present invention relates to warning light systems intended primarily for installation on land and marine vehicles and particularly to a light bar assembly having an integrated modular design and a method of assembly therefor.

2. Description of the Related Art

Warning light assemblies in the form of light bars mounted on emergency vehicles are well known in the art. The modern trend is toward compact, low profile, self contained light bar assemblies. Compact and low profile light bar assemblies improve the aerodynamic efficiency and significantly reduce wind noise typically generated by a light bar.

U.S. Pat. No. 4,620,268 to Ferenc represents a significant advance in the design of such light bar assemblies. The Ferenc light bar is built around an I-beam structural member and includes lens elements that engage the front and rear edges of upper and lower horizontal structural elements of the I-beam so as to span the horizontal length of the light bar. Each end of the light bar assembly is provided with a molded plastic end cap which abuts the ends of the I-beam and lenses to define an enclosure.

While this design represents an important advance over the prior art and has enjoyed significant commercial success, the patented monolithic I-beam support member complicates the manufacture and service of the light bar assembly. The strengthening web connecting the upper and lower structural members of the I-beam support member holds the upper and lower portions at a fixed distance. Any light bar design requiring an alternative height must use a different I-beam support member. Additionally, since the top and bottom structural members of the I-beam are permanently attached to each other, any work on the interior of the light bar must be performed through openings at the ends and along the sides of the I-beam. Further, the space inside the I-beam support member is necessarily bifurcated by the support web. This bifurcated space is inherently less useful than a unitary space.

There is a modern trend toward self contained light bars where the light bar includes the power supplies and signal processing equipment necessary for operation of a light bar. Such self-contained assemblies are desirable because they require fewer interconnections with a host vehicle, simplifying installation and maintenance.

SUMMARY OF THE INVENTION

These and other deficiencies of the prior art are overcome by the present invention. A preferred embodiment of a light bar in accordance with the present invention comprises an elongated base and top panel supported above the elongated base by a plurality of ruggedly constructed electronics enclosures. The electronics enclosures serve multiple functions. First, each enclosure surrounds and supports the electronic components of the power supply. Second, each enclosure provides a robust mechanical connection between the base and top plate. Third, each enclosure includes means for transmitting heat generated within the power supply to an externally mounted heat sink plate. A thermal transfer interface is formed between the heat sink plate and the top plate.

An object of the present invention is to provide a light bar with improved ease of manufacture and maintenance.

Another object of the invention is to provide a new and improved light bar that can be assembled from interchangeable components into a variety of configurations.

These and other objects, features and advantages of the invention will become readily apparent to those skilled in the art upon reading the description of the preferred embodiments, in conjunction with the accompanying drawings.

DETAILED DESCRIPTION OF THE PREFERRED EMBODIMENT

Figure 1:
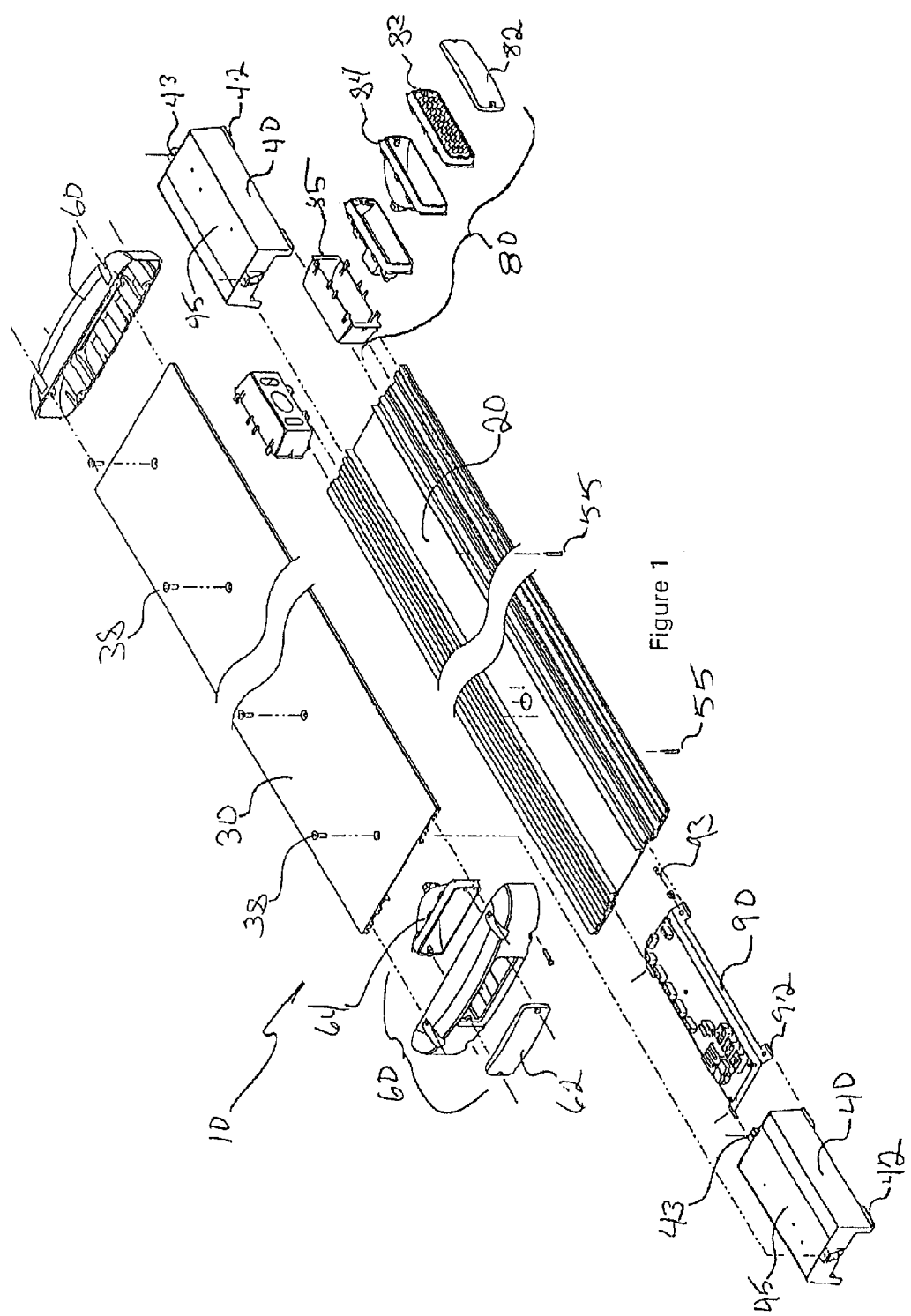
FIG. 1 is an exploded perspective view of a light bar in accordance with the present invention.
Figure 2:
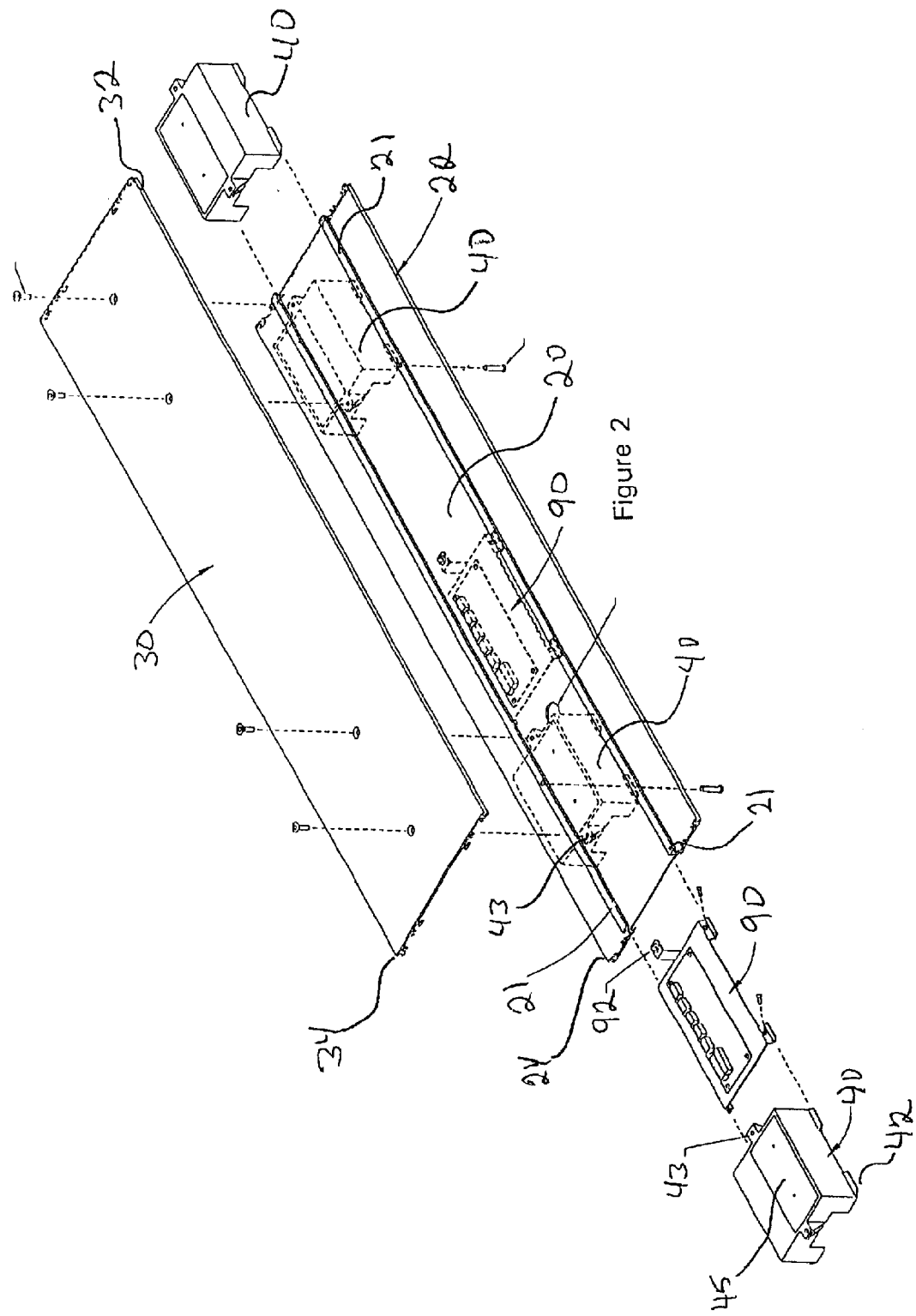
FIG. 2 is an exploded perspective view illustrating the assembly order and configuration of some components of an alternative embodiment of a light bar in accordance with the present invention.
Figure 3:
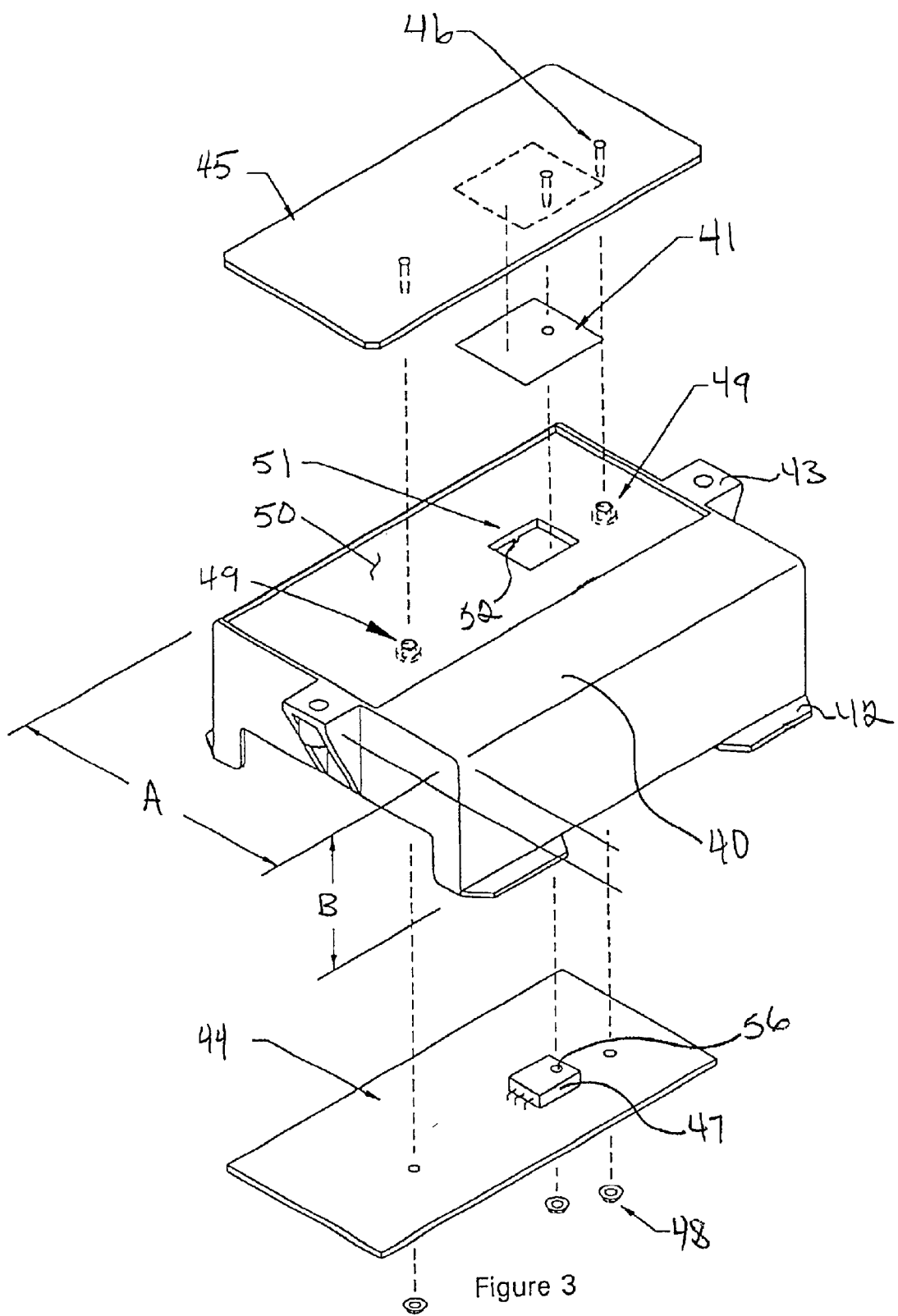
FIG. 3 is an exploded perspective view of a power supply for use in conjunction with the light bar of FIG. 1.
Figure 4:
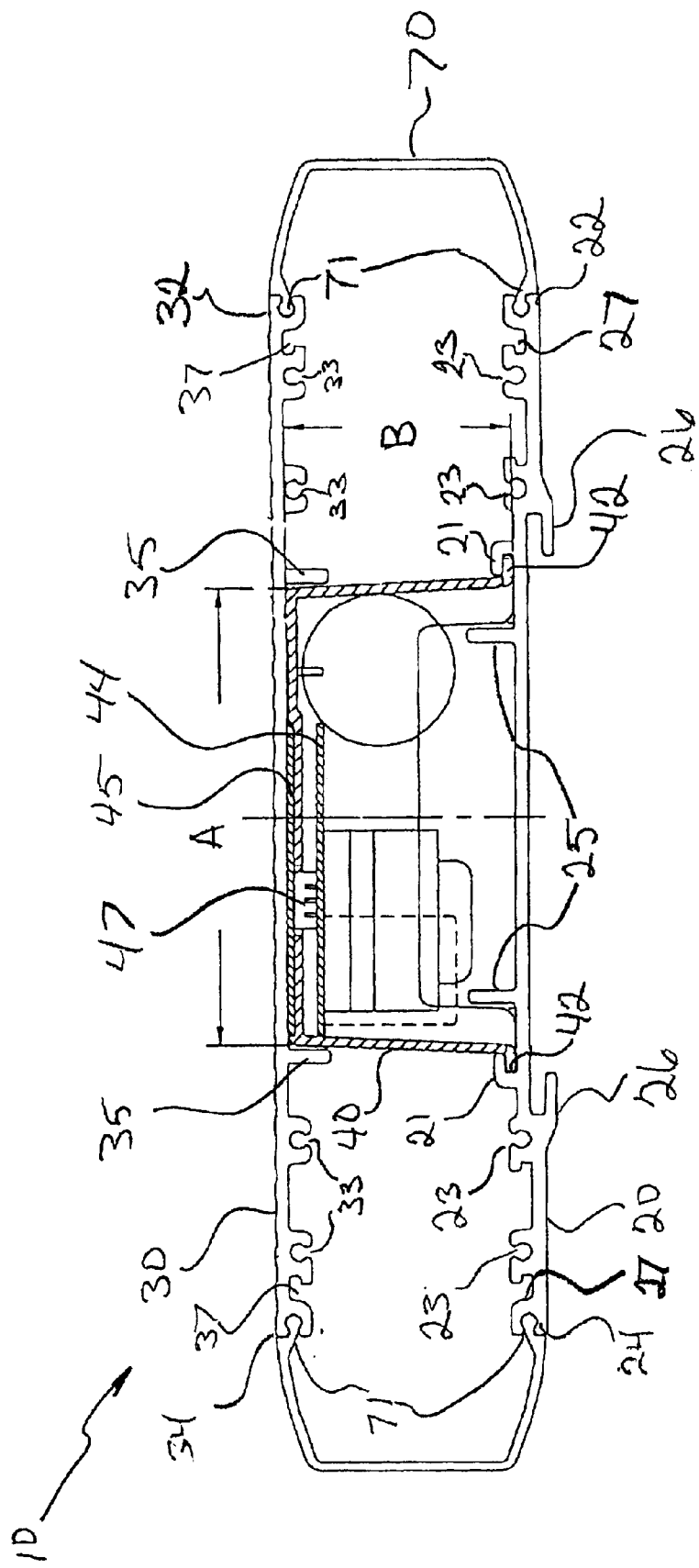
FIG. 4 is a sectional view through a base top panel, lenses and power supply assembled in accordance with the present invention.

Referring more particularly to FIGS. 1 through 8, wherein like numbers refer to similar parts, a light bar 10 in accordance with the present invention is illustrated in FIGS. 1 and 4. Throughout the figures, it will be understood by those of skill in the art that some features and components of the light bar assembly are omitted for clarity.

FIG. 1 is an exploded view illustrating many of the components of a first embodiment of a light bar 10 in accordance with the present invention. The light bar 10 is characterized by the interdependence of its modular components. The primary structural components of the light bar 10 are a longitudinally extending base 20 and a complementary longitudinally extending top panel 30. The base 20 and top panel 30 are preferably extruded from high strength materials such as aluminum, although other methods of manufacture and materials may also be appropriate. Extrusion is an efficient means of producing components that have a uniform transverse cross-section.

With reference to FIG. 4, it can be seen that the base and top panel are generally planar and include a plurality of uniform longitudinally extending features. Strengthening ribs 25 project perpendicular to the base 20 along its length. Corresponding strengthening ribs 35 project perpendicular to the top panel 30 along its length. The strengthening ribs 25, 35 provide stiffness to the base 20 and top panel 30, respectively, while also serving as location and assembly aids as will be discussed below. The longitudinal edges of the base 20 and top plate 30 define elongated slots. The light bar 10 is configured to be mounted on an emergency vehicle with the length of the light bar perpendicular to the path of vehicle travel, presenting a horizontally extended pattern of warning lights fore and aft of the emergency vehicle. Therefore, one longitudinally extending edge of the base 20 and top plate 30 will face in the direction of vehicle travel and are designated the base forward slot 22, and top plate forward slot 32, respectively. The rearward facing longitudinal slots are designated the base rear slot 24 and the top panel rear slot 34.

The base 20 also includes a plurality of extruded fastener receptacles 23. Since the fastener receptacles 23 are another extruded feature of the base 20, any longitudinal section of the base 20 includes screw receptacles 23 disposed at intervals across the opposed transverse ends. The aluminum material defining the screw receptacles 23 readily accepts self-tapping hardware to form a secure threaded engagement. The extruded top plate 30 includes similar complementary extruded screw receptacles 33.

The illustrated preferred embodiment of the base 20 also includes spaced apart, inward facing top and bottom mounting tracks 21, 26, respectively. The bottom mounting tracks 26 define a location for fixing mounting hardware, such as mounting brackets extending from the host vehicle (not illustrated), to the base 20. The longitudinally extending bottom mounting tracks 26 allow the light bar 10 to be secured to a host vehicle anywhere along the length of the base 20.

With reference to FIGS. 1, 2 and 4, the top mounting tracks 21 provide a longitudinally extending mounting location for components of the light bar 10 that will be enclosed between the base 20 and the top plate 30. The base 20 and top plate 30 may be configured with additional longitudinally extending channels and features 27, 37 for engagement of outward facing lighting components installed behind the longitudinally extending lenses 70 as will be further discussed below.

FIGS. 1 and 2 are exploded views of selected pre-assembly components of alternative illustrated embodiments of a light bar 10 in accordance with the present invention. FIG. 1 illustrates the base 20, power supply 40 and top plate 30 of FIG. 4 in an exploded view. In accordance with one aspect of the invention, the electronic components of the light bar 10 are supported above the base 20 on structures engaged with the top mounting tracks 21. Accordingly, input/output assembly 90 and power supply enclosure 40 are equipped with protruding feet 92, 42, respectively, configured to be received by top mounting tracks 21. Once received in the top mounting tracks 21, the I/O assembly 90 is slidably moveable relative to the base 20. Fastening hardware 93 secures the I/O assembly 90 relative to the base 20 and may also provide a ground path to the metal base 20. In some embodiments, the ground path may be extended to the top plate 30 by means of a spring loaded grounding pin 92 (FIG. 2).

In accordance with a particularly significant aspect of the present invention, each power supply enclosure 40 is equipped with mounting brackets 43 arranged along the longitudinal median of the light bar 10. In the illustrated embodiments, each mounting bracket 43 receives a screw 38 which extends through the top plate 30 to rigidly secure the top plate to the respective power supply enclosure 40. The screws 38 are preferably a self-tapping screw with a thread configured for engagement with plastic of the type from which the power supply enclosures are molded. Further, the screws 38 preferably have a head that forms a water resistant seal with the top plate 30. Each power supply enclosure 40 is preferably molded as a single-piece from durable high-strength plastic. A preferred plastic is DuPont Zytel®. Thus, the power supply enclosure 40 serves as a primary structural link between the base 20 and the top plate 30.

FIG. 3 is an exploded perspective view of the primary pre-assembly components of a power supply in accordance with the present invention. The electronic components of the power supply are mounted to a printed circuit (PC) board 44 and include at least one power transistor 47. The power transistor 47 generates heat as is known in the art and is provided with a through hole 56 for securing the power transistor to a heat sink. The power supply housing 40 includes a plate recess 50 in the top exterior surface. The plate recess 50 is configured to receive a heat sink plate 45.

Figure 5:
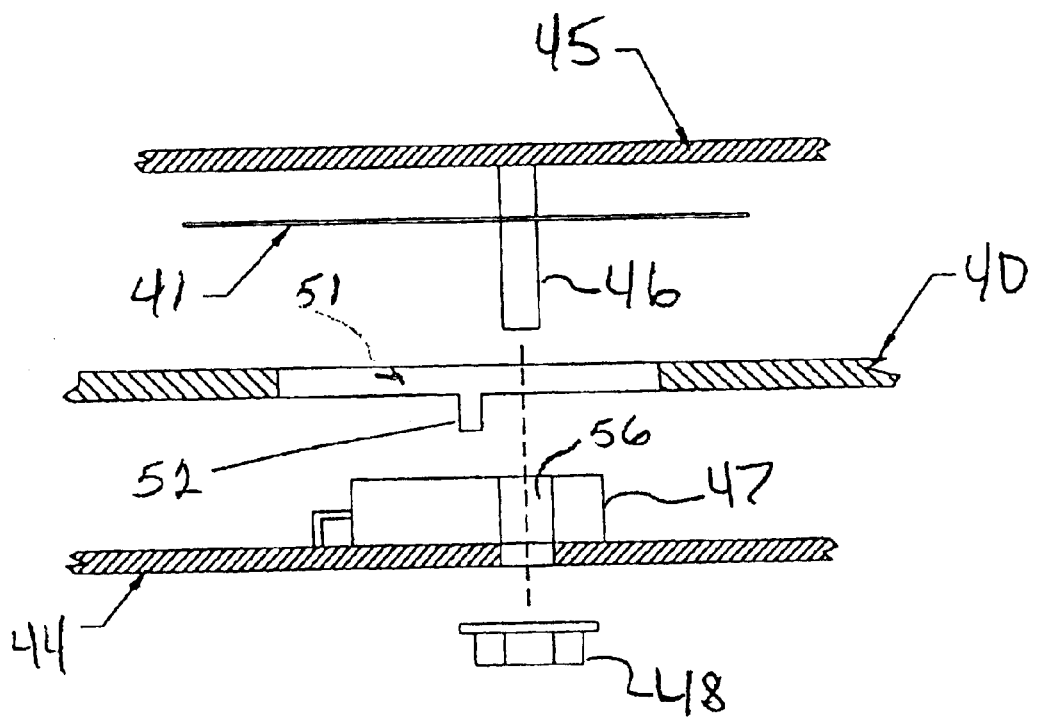
FIG. 5 is an enlarged, exploded sectional view through a portion of the power supply of FIG. 3.
Figure 6:
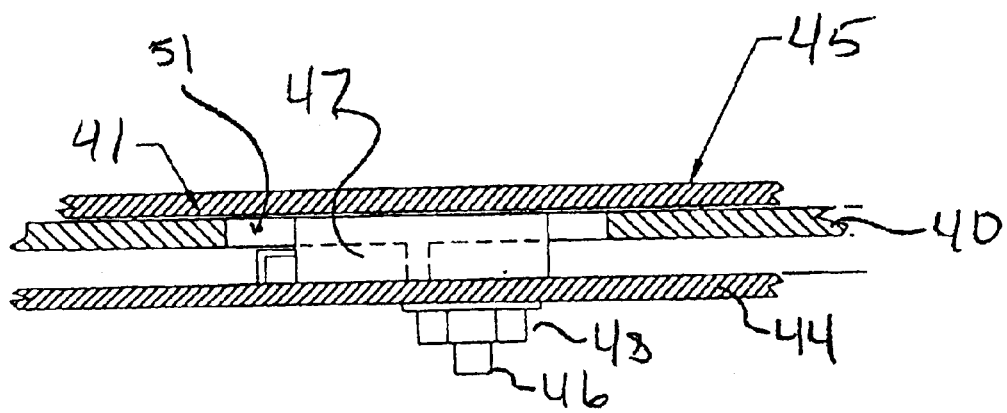
FIG. 6 illustrates the components of FIG. 5 in an assembled configuration.

The pre-assembly and assembled configurations of the power supply are best discussed with reference to FIGS. 5–8. FIG. 5 shows an exploded view of some preassembly power supply components. The illustrated components are the PC board 44, power supply housing 40, heat sink plate 45, co-therm seal 41, mounting stud 46 and nut 48. These components are assembled in a sandwich configuration as illustrated in FIG. 6. An opening 51 is provided in the upper surface of the power supply housing 40, permitting the power transistor 47 to protrude through the power supply housing 40 and form a heat transfer interface with the co-therm seal 41 and ultimately with the heat sink plate 45. So, while the PC board 44 is mounted within and protected by the power supply enclosure 40, the power transistor 47 is disposed flush with the outside surface of the power supply housing 40 in the heat sink recess 50. As can be seen from FIG. 6, this allows the co-therm seal 41 to be captured between the heat sink plate 45 and the outside surface of the power supply housing 40 while also being engaged by the power transistor 47. A standoff 52 molded inside the power supply housing 40 permits tension to be accumulated between the heat sink plate 45 and the PC board 44 by the nut 48 and mounting stud 46 while reducing the risk that the power transistor 47 will be damaged. The standoff 52 also maintains a pre-determined distance between the PC board 44 and the power supply housing 40.

Figure 7:
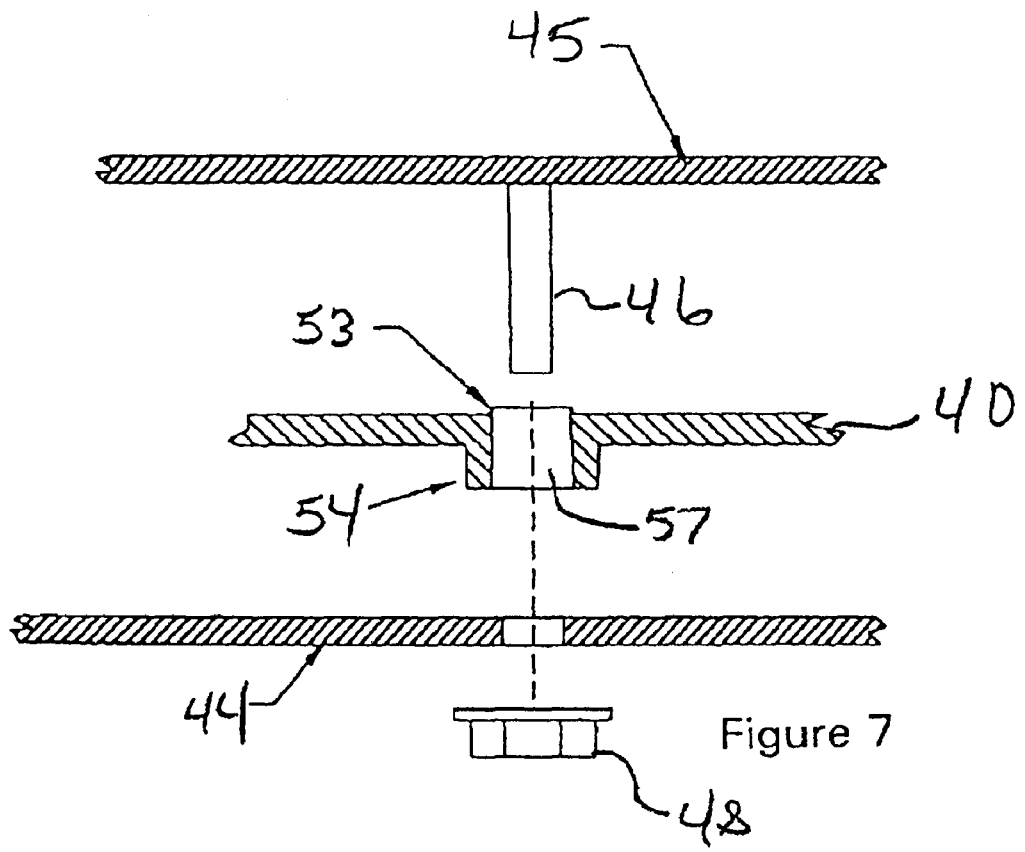
FIG. 7 is an enlarged, exploded sectional view through a portion of the power supply of FIG. 3.
Figure 8:
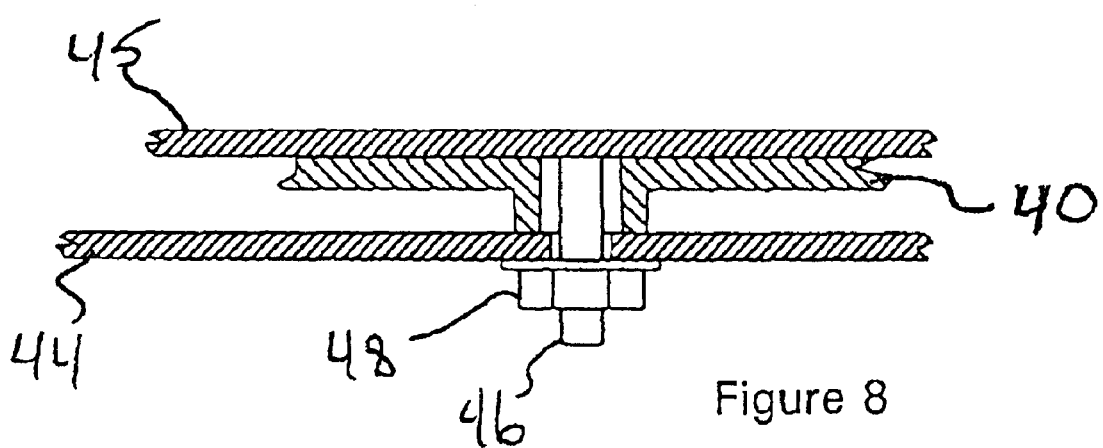
FIG. 8 illustrates the components of FIG. 7 in an assembled configuration.

FIGS. 7 and 8 are exploded and assembly sectional views, respectively, through the PC board 44, power supply housing 40 and heat sink plate 45. The power supply housing 40 is provided with an opening 57 through which a mounting stud 46 passes to provide a connection between the heat sink plate 45 on the outside of the housing and the PC board 44 on the inside of the housing. Each through hole 57 in the power supply housing 40 is configured with a standoff 54 on the inside of the housing to maintain the predetermined separation between the PC board 44 and the power supply housing 40. A lip seal 53 projects toward the heat sink plate 45 from the outside surface of the power supply housing surrounding the through hole 57. This lip seal 53 is approximately 0.015" high and configured to deform or crush in response to tension exerted on the mounting stud 46 by a nut 48. FIG. 8 illustrates the components in an assembled configuration. The tightly compressed co-therm seal 41 and lip seal 53 provide water-resistant barriers between the interior and exterior of the power supply housing 40.

It will be understood by those of skill in the art that electronic components including power transistor 47 must be interconnected as a power supply circuit and supported structurally to resist vibrations and shocks present in an automotive or marine emergency vehicle environment. Therefore a power supply and associated housing are necessary components of a light bar. The inventive light bar, as illustrated in FIG. 4, efficiently integrates the power supply housing 40 into the light bar assembly 10 as a structural member extending between the base 20 and the top plate 30. Thus, the power supply housing 40 not only supports and protects the power supply, but also serves as a structural support and mounting location for the top panel 30.

Each power supply housing 40 has a lateral dimension A and a height B. The height B of the power supply housing 40 determines the space defined between the top plate 30 and the base 20. The lateral dimension A of the power supply housing 40 is matched to the lateral spacing between top mounting tracks 21 and strengthening ribs 25 and 35. Alternative light bar configurations may require larger or smaller height dimensions B to accommodate alternative light emitting apparatus. Conveniently, such alternative light bar configurations will also likely require alternative power supply configurations. In the inventive light bar 10, alternative power supplies may be configured to provide the appropriate height dimension B as well as provide power for the alternative light bar configurations.

With reference to FIG. 4, the light bar 10 includes lenses 70 with longitudinally extended protrusions 71 configured to mate with a pair of slots defined along the front and rear edges of the base 20 and top plate 30. The protrusions 71 of each lens mate to a respective pair of, for example, base forward slot 22 and top plate forward slot 32 or base rear slot 24 and top plate rear slot 34 and are inserted into the slots until the lens 70 is aligned with the ends of the base 20 and top plate 30. Together, the base 20, top plate 30 and lenses 70 define a substantially sealed interior space. Each lens may be a monolithic extrusion or alternatively, may be comprised of different colored lens portions (not illustrated) mounted end to end with a compressive seal between them.

Lighting components 80 are arranged along the length of the front and rear edges of the light bar 10. Each lighting component 80 comprises a number of standard parts such as a reflector 84, a lamp holder 83 and lens 82 that are selected from interchangeable parts, permitting customization of the light bar to specifications. The light unit housing 85 is configured to engage the longitudinally extending channels 27 of the base 20. The top plate 30 can be left off the light bar 10 during assembly, which simplifies making the electrical interconnections between the light units 80, the I/O assembly 90 and power supplies.

End caps 60 are configured to engage the ends of the top plate 30 and base 20 as well as the lateral ends of the longitudinally extending lenses 70. Each junction of an end cap with the top plate, base and lenses is preferably provided with a flexible seal to prevent water penetration. Fasteners pass through the end cap 60 to engage the fastener receptacles 23, 33 in the base 20 and top plate 30, respectively. The end cap light unit 64 is mounted within the end cap 60 by fasteners that pass through the exteriorly mounted lens 62. It will be understood by those of skill in the art that the end cap light units 64 can be wired into the light bar and later secured within the end cap 60.

When all the electronic components have been secured to the base 20 and the interconnections made the top plate 30 is then secured to the power supply housing fastening brackets 43 by screws 38. The power supply housings 40 were previously restrained from moving inwardly by the power supply stop screws 55 and are now constrained from moving outwardly by their connection to the top plate 30. In this manner the base 20 is connected to the top plate 30 by the power supply housing 40 in such a manner that the relationship between the base and top plate is substantially fixed. The longitudinally extending lenses 70 are engaged in the front slots 22, 32 and rear slots 24, 34 and moved into alignment with the top plate 30 and base 20. The resulting configuration resembles the illustration of FIG. 4 with the exception that FIG. 4 does not show any light units 80 or 64 secured within the space enclosed by the base, top plate and lenses.

Next, the end caps 60 are installed. When installed, the end caps exert a compressive force against the longitudinally extended lenses 70 restraining them from sliding out of their respective slots. Light units 64 are secured to the installed end cap by fasteners through lens 62. It will be understood by those of skill in the art that the interrelationship between the end caps 60 and the lateral ends of the top plate and base supplement the structural support provided by the power supply housings 40. Thus, the end caps serve not only a closure function but also support a light unit and provide structural rigidity to the assembled light bar 10. Together, the components of the light bar 10 provide a versatile, rigid, sealed enclosure. Many of the various components of the light bar 10 are interchangeable, resulting in virtually infinite custom configurations.

With reference to FIG. 4, it will be understood by those of skill in the art that a broad thermal interface occurs between the top plate 30 and the externally mounted heat sink plate 45. Thus, top plate 30 acts as a large extension for the heat sink plate 45. The heat radiating capability of the top plate is more than sufficient to dissipate heat produced by the power transistors 47 of multiple power supplies, if necessary, because the top plate 30 is generally exposed to moving outside air due to movement of the land or marine vehicle.

It will be understood by those of skill in the art that each electronics enclosure 40 performs at least three functions: enclosing and surrounding the power supply components; structurally connecting the top plate 20 to the base plate 30; and providing a heat transfer interface between the power transistor 47 and the top plate 30.

With reference to the FIGS. 1–4 and the foregoing discussion, a preferred method for assembling a light bar 10 in accordance with the present invention is as follows:

1. select the overall length of the finished light bar;
2. cut a length of top plate and base that will result in the desired length light bar;
3. drill at least one cabling opening through the base to permit wiring the light bar 10 to the host vehicle (not illustrated);
4. mate an I/O assembly 90 to top mounting tracks 21 and slide the I/O assembly into the base;
5. secure the I/O assembly to the base in a selected location using mounting hardware;
6. install power supply stop screws;
7. mate the power supply housings 40 to the top mounting tracks 21 and slide the power supply housings onto the base until they contact the power supply stop screws;
8. install selected lighting components 80 in selected configurations and locations along the front and rear edges of the base 20;
9. install selected lighting components 64 adjacent the ends of the base;
10. make all necessary wiring interconnections between the power supply, I/O assembly and lighting components 80, 64;
11. prepare holes in top plate 30 for screws 38;
12. secure top plate 30 to power supply housings with screws 38;
13. select appropriate lengths of lens 70 for front and rear of light bar;
14. mate lenses 70 with front and rear longitudinal slots of base and top plate and slide lenses into position flush with the transverse ends of the base and top plate;
15. secure the end lighting fixtures 64 to the end caps 60 using hardware through lenses 62;

16. mount end caps 60 to the transverse ends of the base and top plate with screws through the end cap into the screw receptacles 23, 33.

According to another aspect of the invention, it will be noted by those of skill in the art that all the internal components, i.e. lighting components 80, power supply housings 40 and I/O assembly 90, are slidable relative to the extruded base 20. This feature of the invention facilitates efficient positioning and alignment of the components during assembly. The modular design also aids diagnosis and repair of the inventive light bar 10. The components are held in the selected position by mounting hardware or frictional engagement, i.e. clamping, between the base 20 and top plate 30.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A light bar assembly comprising:

an elongated base having front and rear elongated slots;

first and second electronics enclosures mounted to said base at longitudinally spaced positions thereof;

a top panel having front and rear elongated slots and supported by said enclosures generally parallel to said base;

at least one cover slidably received in said base and top panel front slots;

at least one cover slidably received in said base and top panel rear slots to define a light bar enclosure therebetween; and a plurality of warning light assemblies secured within said light bar enclosure.

2. The light bar assembly of claim 1, wherein said base is an extruded one-piece member.

3. The light bar assembly of claim 1, wherein said top panel is an extruded one-piece member.

4. The light bar assembly of claim 1, wherein said base and top panel each have opposed ends and further comprising a warning light assembly mounted to each of said ends.

5. The light bar assembly of claim 1, wherein said electronics enclosures each enclose a power supply.

6. The light bar assembly of claim 5, wherein each said electronics enclosure defines an interior space and includes an outside surface, said power supply comprising at least one heat generating component and a heat sink comprising a metal plate, wherein said metal plate is arranged on said outside surface and an opening is provided in said enclosure, said heat generating component arranged in said interior space adjacent said opening and joined to said heat sink so that a thermal transfer interface is provided between said component and said heat sink.

7. The light bar assembly of claim 5, wherein said top panel comprises a metal and each said power supply comprises heat transfer interface means for defining a heat transfer interface with said top panel through each said electronics enclosure, whereby said top panel serves as a heat sink for said power supplies.

8. The light bar assembly of claim 1, wherein said base defines a length between opposed ends and a width between said elongated slots, said base further comprising at least two tracks substantially traversing the length of said base transversely inwardly from and parallel to said elongated slots, each said electronics enclosure comprising a plurality of feet, each said foot configured for slidable engagement with one said track, whereby each said electronics enclosure is retained to said base by the engagement of said feet with said tracks and each said electronics enclosure is slidable relative to said base.

9. The light bar assembly of claim 1, wherein said electronics enclosure has a height and said height defines a dimension of said light bar enclosure extending between said base and said top panel.

10. The light bar assembly of claim 1, wherein at least one of said first and second electronics enclosures comprises:

a rigid housing defining an upper surface, an interior space and configured for mounting to said elongated base at a housing lower extremity, said housing upper surface defining an opening communicating with said interior space;

at least one heat generating component mounted in said interior space adjacent to and partially penetrating said opening; and a heat sink comprising a metal plate arranged outside said enclosure and in thermal contact with said at least one heat generating component;

wherein said top panel is thermally conductive, includes a bottom surface and is secured to said housing upper surface in thermally conductive contact with said heat sink, whereby a heat transfer path is defined from said heat generating component to said top panel.

11. A method of assembling a light bar comprising the steps of:

providing a selected length of extruded base and top plate;

providing at least one electronics enclosure;

providing lighting components configured for mounting between said extruded base and top plate;

securing said at least one electronics enclosure to said extruded base;

securing said top plate to said at least one electronics enclosure; and securing said lighting components between said extruded base and top plate, whereby said electronics enclosure serves as a structural support between said base and top plate and determines a distance between said base and top plate.

12. The method of claim 11, wherein said step of providing at least one electronics enclosure comprises equipping said electronics enclosure with an externally mounted heat sink plate and said step of securing said top plate to said at least one electronics enclosure comprises establishing a heat transfer interface between said electronics heat sink plate and said top plate.

13. The method of claim 11, wherein said step of securing said lighting components between said extruded base and top plate comprises:

slidably positioning said lighting components relative to said extruded base and top plate.

14. The method of claim 11, wherein said at least one electronics enclosure comprises an upper surface including fastener-receiving mounting brackets and said step of securing said top plate to said at least one electronics enclosure comprises extending fasteners through said top plate to engage said mounting brackets.

15. The method of claim 14, wherein the step of providing at least one electronics enclosure comprises providing two said electronics enclosures.

\* \* \* \* \*